Aug. 13, 1963     T. R. ROBINSON, JR     3,100,358
RIFLED GUN BARREL

Original Filed May 13, 1953     3 Sheets-Sheet 1

INVENTOR
Thomas R. Robinson Jr.
BY
ATTORNEYS

Aug. 13, 1963 T. R. ROBINSON, JR 3,100,358
RIFLED GUN BARREL
Original Filed May 13, 1953 3 Sheets-Sheet 3

INVENTOR
Thomas R. Robinson Jr
BY Rockwell & Bartholow
ATTORNEYS

# United States Patent Office 3,100,358
Patented Aug. 13, 1963

3,100,358
RIFLED GUN BARREL
Thomas R. Robinson, Jr., New Haven, Conn., assignor to The Marlin Firearms Company, New Haven, Conn., a corporation of Connecticut
Continuation of application Ser. No. 354,712, May 13, 1953. This application Nov. 27, 1959, Ser. No. 856,331
2 Claims. (Cl. 42—78)

This invention relates to rifled gun barrels and more particularly to a barrel having a new, novel and advantageous type of rifling and to a method of effecting such rifling, the barrel so made possessing to a degree not hitherto attained the attributes of low cost of manufacture, extreme accuracy of performance and long useful life. The present application is a continuation of my application, Serial No. 354,712, filed May 13, 1953, now abandoned.

In the manufacture of rifle barrels, the barrel is commonly provided with a series of helical grooves cut in the otherwise smooth wall of the bore of the barrel in order to give the projectile a rotative motion or twist. These grooves and the lands generated between them are generally referred to as rifling. Normally about four or six of these grooves are provided in the bore, and they are usually made by a cutting tool which is passed through the bore of the barrel a number of times to complete the cutting of each groove.

For example, a .30 caliber rifle may have from four to six of such grooves which may be cut to a depth of .004 in. This means that the bore diameter of the barrel across the lands between the grooves is .300 in., while the groove diameter across the bottoms of the grooves is .308 in., the average being approximately .304 in. The cutting tool which is passed through the barrel removes a small amount of this metal at each pass, the amount removed being approximately .0005 in. This means that it would require eight passes of the tool to make a cut of a depth of .004 in., and thus require eight passes for each of the grooves or 32 passes of the tool for a barrel having four rifling grooves. This requires a considerable length of time, in some instances up to 20 or 25 minutes, to cut the grooves in one barrel.

In some instances it has been proposed to shorten the time required for providing the rifling in a barrel by the use of a broaching tool having multiple cutting points which will form the groove with one pass of the tool. This tool is provided with a number of circular lands of successively larger size and appropriately notched to give the groove-land width relationship, the lands between the notches being arranged behind each other helically upon the broach with the appropriate helix angle required for rifling. Such tools, although giving more rapid machining time for a finished barrel, are prone to shatter and are costly to fabricate and keep in condition for use. Furthermore, in smaller bore guns, such as .22 and .25 caliber, provision of adequate clearance for the metal removed in the one or sometimes two broach passes makes for a weak and generally unreliable tool. Furthermore, any one of the large number of individual cutting faces of the broach may at any time dull and consequently scratch or score the groove in which the land is cutting.

When bullets of appropriate size, which are approximately the groove diameter of the barrel, are forced through the barrel by the firing of a propulsive charge, the engagement of the helical lands with the material of the bullet imparts to the latter rotating motion necessary to stabilize it in flight, and the function of the rifle is to impart to the projectile the minimum rotational velocity necessary for this stabilization. As is understood, the only portion of the rifling which significantly effects this rotation is one side or the driving side of each of the lands in the bore of the barrel, and it is the general experience that with 4 or 6 groove rifling, as is commonly employed in a .30 caliber rifle, the minimum depth of groove must be approximately .004 in. to form a minimum driving land side of .004 in. which is required for reliable engagement of the bullet by the land to impart the necessary spin to the bullet. Attempts to reduce manufacturing costs by decreasing the number of grooves or decreasing the depth of grooves to shorten the machining time, have resulted in barrels which do not engage the projectile over a sufficient area, and the result is a consequent failure to impart the necessary rotational velocity to the bullet.

The effective driving area of the side of the lands working on a projectile may be roughly computed as the land side height multiplied by the length of the engagement of the land with the projectile and multiplied by the number of lands in the bore. Thus, if in a .30 caliber barrel we assume a land engagement with the projectile for a length of ½ inch, the effective engaging area of all of the lands with the projectile will be .004 times .5 times the number of grooves (either 4 or 6) provided in the barrel. It will be seen, therefore, that the area of engagement in a .30 caliber firearm would be from .008 to .012 sq. inches depending upon whether 4 or 6 grooves are provided.

It will also be seen that if the groove is made of a depth of .004 in. in a .30 caliber barrel, the groove depth will be approximately 1/75 or more of the bore diameter of the barrel and the groove depth is always greater than 1/100 of this diameter. If it is attempted to reduce the depth of the groove in order to shorten the manufacturing time required to make the barrel below this figure, faulty engagement of the rifling lands with the projectile results and a consequent failure to give the projectile the desired spin. Attempts to counteract the reduction in the depth of the groove by increasing the number of grooves to give more driving land sides also prevents any increase in efficiency in production because the total number of grooves must be increased correspondingly to the reduction in depth. Furthermore, with an increased number of grooves to be cut in a barrel, the mechanical requirements for production equipment become so complex as to render the increase in the number of grooves cut a practical impossibility with existing machinery beyond relatively low numbers of grooves.

According to the present invention the grooves are provided by a cold swedging method in that a tool having helical ribs thereon is forced through the barrel, the tool displacing the metal to form the grooves. The number of swedging ribs provided on the tool is the same as the number of rifling grooves provided in the bore of the finished barrel, and it is only necessary for this swedge or button to make one pass to complete the rifling operation so that the rifling time according to the present invention is 2 to 5 seconds per barrel as compared with the much longer time noted above in the usual rifling operation.

In rifling a barrel by the swedging operation of the present invention, I provide a much greater number of rifling grooves that has heretofore been the practice and swedge these grooves to a much lesser depth. The number of grooves may, of course, vary, but I have found that 16 of these comparatively minute grooves give good performance in the firearm having a barrel so made. Moreover, the depth of the grooves is approximately .0015 as compared with the grooves having a depth of .004 as is the usual practice. The bore diameter is enlarged to maintain the same or greater effective cross section as compared with common practice. In other words, the barrel of a .30 caliber gun according to the present invention would have a bore diameter across the lands between the grooves of .304 in. and a groove diameter across the bottoms of the grooves of .307, the average being .3055 in.

One of the advantages of this rifling is the bore cross section is increased allowing the bullet to pass with less resistance, resulting in higher velocities and lower pressures. Also the groove diameter is less than that of the .30 caliber bullet which is usually .308 in. This results in improved obturation of the bore.

One object of the present invention is to provide a new and improved method of rifling rifle barrels.

A further object of the invention is to provide a method of rifling rifle barrels wherein a plurality of rifling grooves may be provided by a single pass of a swedge which effects a plastic deformation of the metal of the barrel to form a relatively large number of relatively shallow grooves in the bore of the barrel.

Still another object of the invention is to provide a rifle barrel having improved rifling thereby giving the gun increased accuracy in action.

To these and other ends the invention consists in the novel features and combinations of parts to be hereinafter described and claimed.

Figure 1:
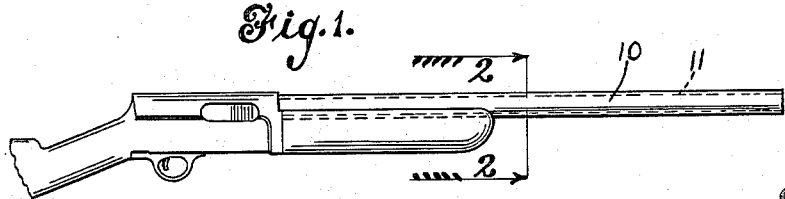
FIG. 1 is a side elevational view of a rifle barrel embodying my invention.
Figure 2:
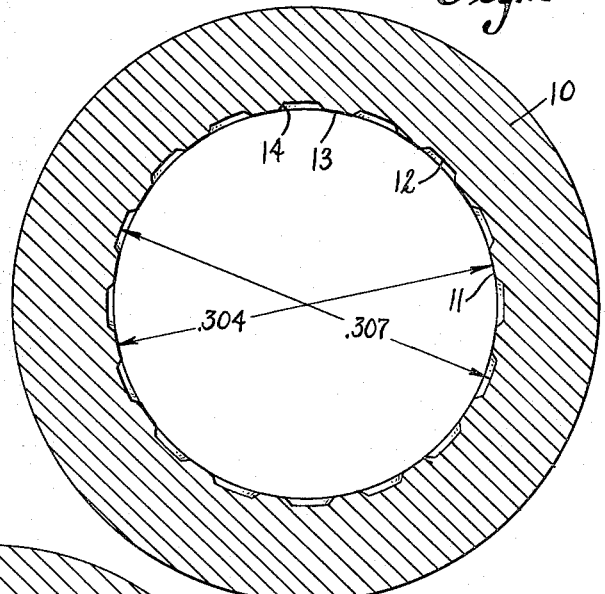
FIG. 2 is a cross sectional view of the barrel showing my improved rifling.

To illustrate a preferred embodiment of my invention I have shown in the drawings a rifle barrel 10 having the usual bore 11. It will be noted from the sectional view shown in FIG. 2 that the barrel contains a large number of relatively minute rifling grooves 12 which, as is usual, are formed helically about the barrel bore so as to give the projectile a twisting or rotating movement about its axis. These grooves, as will be more fully explained hereinafter, are preferably formed by a swedging operation. Lands 13 are provided between the grooves, having land sides 14 to engage the bullet.

Figure 5:
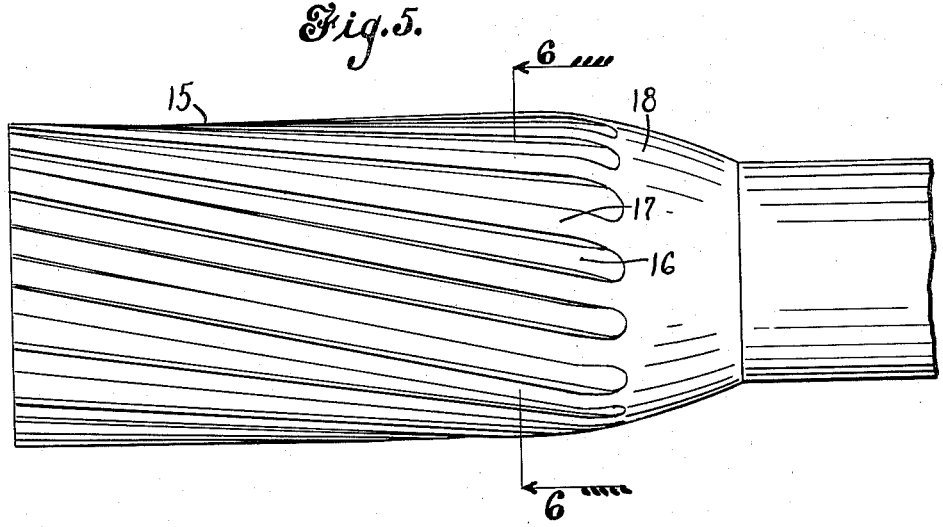
FIG. 5 is a side elevational view of the swedge or "button" used to effect the rifling operation.
Figure 6:
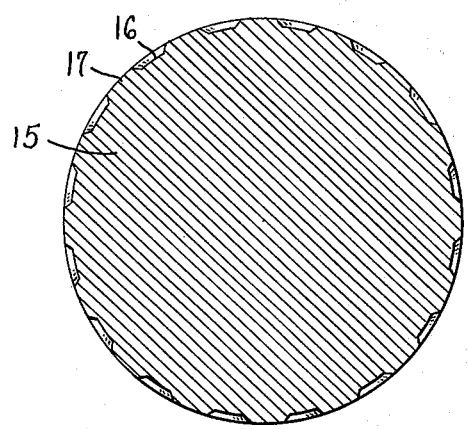
FIG. 6 is a cross-sectional view of the "button."

The tool employed for forming the grooves is shown in FIGS. 5 and 6 and consists of a swedge or button 15 so mounted that it may be forced through the bore of the gun with considerable pressure. Provided on the button 15 are a plurality of helical grooves 16, defining lands 17 on the button which form the grooves in the bore of the barrel by plastic flow of the metal. These lands 17 are of such dimensions that a diameter across two opposed grooves in the barrel formed by these will be approximately .307 in. for .30 caliber rifles and are of sufficient height so that the bottoms of the grooves 16 between them will not foul the lands formed in the gun barrel. As shown, there are 16 of these lands formed on the swedge 15 so as to form 16 grooves in the bore of the gun at one pass of the swedge. As stated above, in a .30 caliber rifle, the grooves will preferably be substantially .0015 inch in depth. It may also be noted that the front end 18 of the swedge member is tapered so as to provide for its easy entrance into the bore of the barrel.

Figure 4:
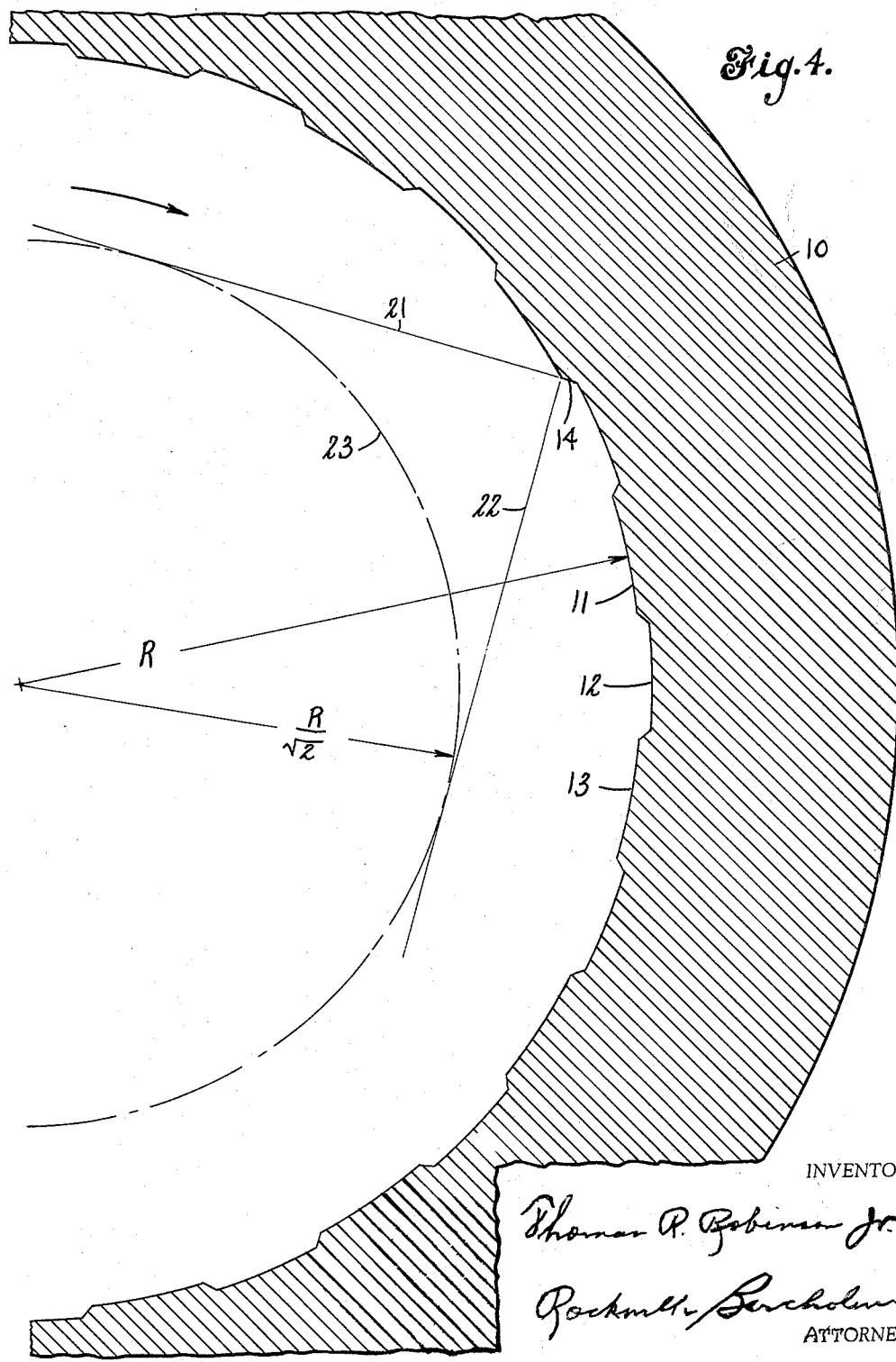
FIG. 4 is an enlarged sectional view of the barrel showing the particular formation of the rifling grooves formed therein.

A very important feature, as may be noted from the enlarged view of FIG. 4, is that the land sides 14 of the rifling grooves 12 are not in a radial plane passing through the axis of the bore, but are inclined or at an angle to such a plane, and this angle is so chosen as to produce a maximum effect on the bullet. It may be assumed that the rifling is so directed as to effect a clockwise rotation of the bullet, as seen in FIG. 4.

The radius of gyration of a solid body of generally cylindrical shape may be considered to be $R/\sqrt{2}$, where R is the radius of the body. The lands are so formed that an element of the sides of the lands, if projected, as shown at 21, is tangent to a circle 23 whose radius is $R/\sqrt{2}$ (R being equal to one half of the bore diameter of the barrel) and whose center is at the center of the bore. Therefore, if the second tangent 22 be drawn from the land side 14 to this circle, it will be found that this line is substantially perpendicular to the side wall of the rifling groove. This side of the land will, therefore, have a maximum effect in inducing a rotative motion in the bullet in that it will act at the proper angle in the bullet material to insure secure engagement of the bullet to produce a maximum spinning effect.

It has been found that by the provision of a large number of rifling grooves in the barrel, as compared with prior practice, these grooves can be made of much smaller depth than has been the practice and at the same time an improved performance of the gun results. Experiments have shown that a rifle provided with rifling as above described will fire with greater accuracy than will the ordinary rifle. Moreover, the rifling can be provided much more economically than has been the case with usual cutting or planing tool and in much less time, thus producing an improved weapon at a reduced cost.

Rifling grooves have been previously formed in gun barrels by a swedging process but these grooves have been of the normal depth, that is a depth of 4/100 or more of the bore diameter, and it has been necessary to perform subsequent operations upon the gun barrel to eliminate the undesirable effects of the swedging process. For example, when a swedging tool has sufficiently high ridges upon it as to form grooves of the depth referred to, there may be a pronounced burring or finning due to the flow of the metal away from the ridge on the tool such that each corner of the lands formed by the forcing of the ridge into the groove has ragged fins which project inwardly toward the bore center and which must be removed to provide a uniform cross section throughout the length of the bore.

Again most rifle barrels are tapered, the wall thickness being greater adjacent the breech than at the muzzle. The action of the swedging tool deforms to some extent the entire cross section of the barrel wall, and the amount of the permanent set or deformation in the wall of the barrel is principally determined by the wall thickness.

In the event that the wall thickness is relatively small, the entire barrel wall may be plastically deformed with the result that, after the swedge has passed, the bore is somewhat enlarged over its conditions prior to the swedging operation. As the swedge progresses toward the breech end of the barrel where the wall thickness is greater, there is less deformation or radial expansion of the metal in the bore wall and more flow-back of the metal displaced by the ridges of the swedge into the land area of the finished bore. This results in a tightening of the bore at the breech end of the barrel, and, it is furthermore noted, a difference in groove diameter of the barrel from the muzzle toward the breech. That is, both bore and groove diameter of the barrel may be found to be greater at the muzzle than at the breech, where, if the wall thickness is sufficiently high, the outer layers of the barrel wall are not stretched beyond their elastic limit and there is, therefore, little or no plastic deformation of these outer layers.

The taper thus formed in the gun enlarging toward toward the muzzle is very injurious to accuracy and to reasonable barrel life for the bullet is free to oscillate laterally in the bore adjacent the muzzle, thus disturbing its guided motion and permitting gases to escape by the bullet which injure the barrel by erosion. Moreover, it is not practical to remedy this difficulty by finish rifling the bore of the barrel while the latter is in its unturned or cylindrical condition as the turning of the gun barrel to the final desired taper produces some distortion of the barrel and consequent deviation of the bore axis which requires straightening. After rifling, the former smooth cylindrical bore surface is disturbed by the rifling so that reasonable straightening of the rifle cannot be reliably effected. Therefore, the remedial operations necessary to counteract the disturbances produced by the swedging of grooves of normal depth substantially increases the overall cost of the product as well as giving dubious performance in the finished product.

The swedging tool which I employ is preferably formed by machining or grinding operations, and the grooves in the swedge which define the lands of the finished barrel are of sufficient depth so that in the swedging of the barrel the metal of the face of the lands being formed does not in general engage with the bottom of the groove in the swedging tool. Therefore, the deep stresses which might otherwise be effected in the metal of the barrel wall are eliminated by the elimination of direct contact with or any cold working of the land surfaces of the bore. The actual volume of the metal displaced by the passage of the swedging tool is substantially less than that which has been previously required in forming grooves of normal depth by swedging operations with a result that deep underlying stresses are not produced.

As previously stated, I have found that 16 of these comparatively minute grooves having a depth of approximately .001 to .0015 in. in a .30 caliber barrel give excellent performance in the firearm so made. The groove depth of such a barrel made according to the present invention would be 1/125 or less of the bore diameter in contrast to the groove depth of 1/100 or more of the bore diameter as found in barrels having conventional rifling. Moreover, it will be found that when the land side of each of the grooves has a height dimension of from .001 to .0015 in., the land area which is effective in producing the rotational spin of the projectile is approximately the same as that of barrels having four to six grooves of a depth of .004 in., for if we multiply this groove depth of .001 in. to .0015 in. times .5 inch (the length of engagement) times 16, we arrive at a product of .008 sq. in. to .012 sq. in., as was found to be the case in the conventional .30 caliber gun.

Figure 3:
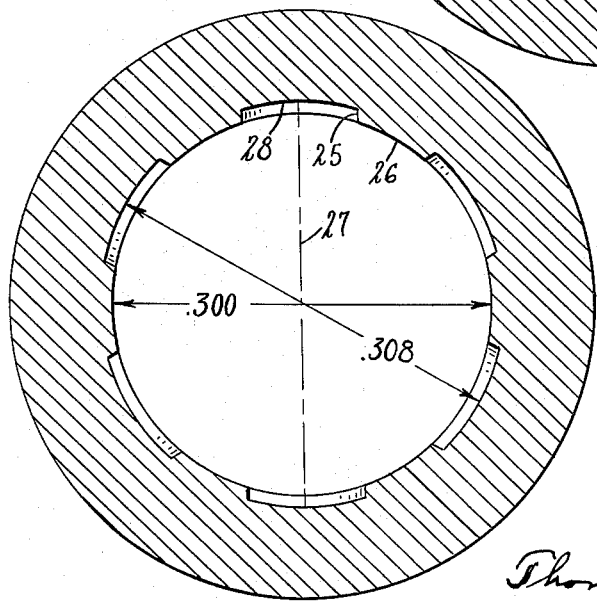
FIG. 3 is a sectional view of a gun barrel provided with conventional rifling.

Also I provide additional security of engagement of the lands with the projectile by virtue of the shape of the lands formed in the barrel. In conventional barrels the land side of each land which engages the projectile is formed by a cutter having two parallel sides such that the opposing faces of two adjacent lands formed by the cutter lie in parallel planes on chords of the bore substantially parallel to a diameter through the center of the adjacent groove. This is shown in FIG. 3 of the drawings where the sides 25 of the lands 26 are substantially parallel to the diameter of the bore 27 passing through the center of the groove 28. The angle at which the land sides engage the projectile will, therefore, vary in accordance with the width of the individual grooves and the number of the grooves formed in the barrel. They furthermore engage the projectile in such fashion that the driving surface tends to cut away from or disengage the material of the projectile, thus throwing up pronounced burrs on the latter.

As opposed to this, I form the driving side of each land so that it is normal or perpendicular to a tangent to a circle constructed about the center of the barrel with the radius equal to the radius of gyration of the projectile so that the full rotational thrust of the land is delivered most efficiently to the projectile to effect rotation without distortion of or cutting of the projectile. This is shown in FIG. 4 where it may be considered the spin given to the projectile is in a clockwise direction, and it will be seen that an element of the surface 14 lies on the tangent 21 to the circle 23 and is perpendicular to the tangent 22. The center of the circle 23 is at the center of the bore, and its radius is equal to the radius of gyration of the bullet.

A further advantage of the present invention lies in the relatively low height of the lands or depths of the grooves. This provides a short path for the heat to travel from the lands to the metal of the barrel, the distance being only approximately one fourth as great as that with the normal depth of groove. Furthermore, the inner surface or top of the land joins the land side at an angle of approximately 135 degrees (the land itself making an angle of approximately 135 degrees with a radial line drawn thereto) so that these corners are not so sharp as the substantially 90-degree corners provided in the usual rifling, and there are no isolated zones in the lands exposed on two sides to heat through substantial areas working on a small mass. The bore surface and particularly the land mass will, therefore, be cooler during shooting than in a conventional barrel, thus prolonging its useful life.

In addition, it is found that when a gun barrel is rifled according to the present invention, there is superior obturation of the projectile in the bore. Due to the efficiency of engagement of the lands with the projectile, as explained above, any slippage of the projectile with consequent deformation as it is forced through the bore is minimized as is any space between the free or unloaded side of the lands and the groove initially formed in the projectile so that there is no gas leakage by the bullet and no resultant erosion. Gas leakage is further prevented by the wedging action of the land as it engages the bullet. Since the land has an included angle between its respective land side of approximately 90 degrees plus the arc angle of the land subtended at the bore axis, the land will more uniformly engage the projectile over its entire surface as compared with conventional lands which have parallel sides.

Another substantial improvement in a gun manufactured according to the present invention is that the projectile is engaged securely by the lands with maximum efficiency and without the deep localized distortion of the projectile effected by the higher lands of a barrel having conventional rifling. Such distortion effects are reduced by approximately one fourth, and a substantial gain in accuracy is achieved. Moreover, an improvement in the surface finish of the working portion of the bore is obtained in that the land sides are not ragged as is usually the case. In the present instance the ribs on the swedging tool having an included angle between their faces of 90 degrees plus the subtended arc angle burnish the metal to a high finish not only on the bottoms of the grooves but also on the driving side or vital working portion of the land. This is in contrast to the common practice wherein the land side is formed by shearing action.

While I have shown and described a preferred embodiment of my invention, it will be understood that it is not to be limited to all of the details shown or the steps described, but is capable of modification and variation within the spirit of the invention and within the scope of the claims.

What I claim is:

1. A gun barrel provided with a plurality of helically disposed rifling grooves in the bore thereof with lands between the grooves, there being at least 5 of such grooves for every 1/10 inch of bore diameter, and the driving side of each of said lands being disposed substantially tangentially to a circle having a center at the bore axis and a radius equal to the radius of gyration of a cylindrical section of the bore.

2. A gun barrel provided with a plurality of helically disposed rifling grooves in the bore thereof with lands between the grooves, there being at least ten of such grooves, and the driving side of each of said lands being disposed substantially tangentially to a circle having a center at the bore axis and a radius equal to the radius of gyration of a cylindrical section of the bore.

References Cited in the file of this patent
UNITED STATES PATENTS

| | | |
|---|---|---|
| 119,846 | Henry | Oct. 10, 1871 |
| 296,958 | Hebler | Apr. 15, 1884 |

OTHER REFERENCES

"The Modern Gunsmith," by J. V. Howe, vol. II, Funk and Wagnalls Co., New York, copyright 1937, pages 112, 115, 116, 157–161.